(12) United States Patent
Miya et al.

(10) Patent No.: US 6,400,700 B1
(45) Date of Patent: *Jun. 4, 2002

(54) CDMA CELLULAR RADIO TRANSMISSION SYSTEM

(75) Inventors: Kazuyuki Miya; Masatoshi Watanabe; Osamu Kato, all of Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/457,785

(22) Filed: Dec. 9, 1999

Related U.S. Application Data

(62) Division of application No. 08/815,621, filed on Mar. 13, 1997.

(30) Foreign Application Priority Data

Mar. 15, 1996 (JP) ................................. 8-059711

(51) Int. Cl.[7] ........................ H04B 7/216; H04B 15/00; H04L 27/227
(52) U.S. Cl. ........................ 370/335; 370/514; 370/342; 375/325; 455/63
(58) Field of Search ................................. 370/342, 343, 370/335, 350, 509, 514; 375/200, 206, 207, 325, 365, 354, 135–136, 140, 142, 145, 149, 150; 455/63

(56) References Cited

U.S. PATENT DOCUMENTS

| | | | | |
|---|---|---|---|---|
| 5,170,413 A | * | 12/1992 | Hess et al. | 370/332 |
| 5,329,547 A | | 7/1994 | Ling | |
| 5,544,156 A | * | 8/1996 | Teder et al. | 375/325 |
| 5,666,352 A | * | 9/1997 | Ohgoshi et al. | 375/200 |
| 5,692,015 A | * | 11/1997 | Higashi et al. | 370/514 |
| 5,719,898 A | * | 2/1998 | Davidovici et al. | 375/200 |
| 5,809,061 A | * | 9/1998 | Shea et al. | 375/206 |
| 5,822,359 A | * | 10/1998 | Bruckert et al. | 375/200 |

(List continued on next page.)

FOREIGN PATENT DOCUMENTS

| | | |
|---|---|---|
| EP | 0652644 A2 | 5/1995 |
| EP | 0716520 A1 | 6/1996 |
| EP | 716520 | 6/1996 |
| EP | 721264 | 7/1996 |
| EP | 0721264 A1 | 7/1996 |
| JP | 7-76049 | 3/1995 |

OTHER PUBLICATIONS

Akihiro Higashi et al., "Performance of Coherent Detection and RAKE for DS–CDMA Uplinks Channels", PIMRC'95, vol. 2, 1995, pp. 436–440.*

(List continued on next page.)

*Primary Examiner*—Wellington Chin
*Assistant Examiner*—Maikhanh Tran
(74) *Attorney, Agent, or Firm*—Stevens, Davis, Miller & Mosher, LLP

(57) ABSTRACT

A base station transmits, in addition to a pilot channel, signals which are multiplexed with pilot symbols inserted in the respective signals in communication channels. As the transmission of the pilot channel as a reference signal for coherent detection is unnecessary with high power so as to attain high reliability, the pilot channel can be transmitted with low power by means of weight in comparison with the communication channel, so that interference with the communication channel of any other station is reduced. Moreover, accurate coherent detection can be made from the pilot symbol inserted in the communication channel on the mobile station side.

23 Claims, 8 Drawing Sheets

U.S. PATENT DOCUMENTS 5,850,393 A * 12/1998 Adachi ........................ 370/335
6,014,550 A *  1/2000 Rikkinen ...................... 455/63
6,028,852 A *  2/2000 Miya et al. .................. 370/335

OTHER PUBLICATIONS

J. Cavers, "An Analysis of Pilot Symbol Assisted Modulation for Rayleigh Fading Channels", IEEE Transactions on Vehicular Technology 40(1991) Nov., No. 4.

Seiichi Sampei, "Rayleigh Fading Compensation Method for 16QAM Modern in digital land Mobile Radio systems" JECS Paper B–11, vol. J72–B–II, No. 1, pp. 7–15, 1989.

Akihiro Higashi et al. "Performance of Coherent RAKE Detection using Interpolation on DS/CDMA" JECS Technical Paper RCS94–98, 1994.

* cited by examiner

CDMA CELLULAR RADIO TRANSMISSION SYSTEM

CROSS-REFERENCE TO RELATED APPLICATION

This is a division of application Ser. No. 08/815,621 filed Mar. 13, 1997.

BACKGROUND OF THE INVENTION

1. Field of the Invention

The present invention relates to a CDMA cellular radio transmission system for use in digital cellular mobile communication and the like.

2. Description of the Related Art

In digital cellular mobile communication, a multiple access method means a line connection method when a plurality of stations simultaneously communicate with one another in the same band zone. CDMA, that is, Code Division Multiple Access is a technique in which multiple access is performed by means of spectrum spread communication for transmitting an information signal spectrum by spreading the spectrum over a band sufficiently wide in comparison with the original information band width and may also be called Spectrum Spread Multiple Access (SSMA). A direct spread method is a method of multiplying an information signal directly by a spread sequence code in the spread process.

Of the detection method in digital communication, a coherent detection method has excellent static characteristics in comparison with a delay detection method and is a method in which Eb/IO necessary for obtaining a certain mean bit error rate is lowest. Moreover, a coherent detection scheme with interpolation has been proposed to compensate transmission signal distortion due to fading (Masaichi Sanbe "Method of Compensating for Fading Distortion of 16 QAM for Land Mobil Communication" JECS Paper B-11, Vol. J72-B-II No. 1 pp. 7–15, 1989). According to this method, a pilot symbol 701 is, as shown in FIG. 7, inserted in an information symbol to be transmitted with each period T so as to make wave detection by estimating a channel transfer function, that is, the circuit condition. Further, a method which apply the above method to the direct spread CDMA has been proposed (Azuma, Taguchi, Ohono "Characteristics of Insert-Type Coherent detection RAKE in DS/CDMA" JECS Technical Paper RCS94-98, 1994). There is also a pilot channel as a method enabling coherent detection in the direct spread CDMA. As shown in FIG. 8, in this method, one pilot channel 801 as a reference detection signal is continuously transmitted to be independent of channels for transmitting information data.

FIG. 4 shows the structure of a base station in a conventional CDMA cellular radio transmission system using a pilot channel. In a forward-link, transmission data (2) to (m) of mobile stations m−1 (1<m) are each spread by spread codes (2) to (m), and the spread data are then multiplies by weight before being multiplexed. A channel for use in transmitting the transmission data from each mobile station such as information data, control data and the like is called a "communication channel". The aforementioned weight is used for transmission power control in the forward-link so as to add weight to transmission power among transmission channels. In a pilot channel 401, on the other hand, transmission data (1) 402 is spread by a spread code (1) 403 in a spread circuit 404, and the spread data is multiplied by weight W (1). The spread data in the communication channels 406 to 411 are then multiplexed in a multiplex circuit 412, and the multiplexed data is up-converted by a radio transmission unit 413 before being transmitted from an antenna 414. At this time, since no information needs to be transmitted with the transmission data (1) 402, it may be unmodulated data (totally 0 or 1).

FIG. 5 shows the structure of a mobile station in the conventional CDMA cellular radio transmission system using a pilot channel. As shown in FIG. 5, the signal received from an antenna 501 is down-converted in a radio reception unit 502. In a pilot channel 503, a phase estimation circuit 511 detects phase information 512 from the output of a correlation circuit 505, and transfers the detected result to the detection circuit 516 of a communication channel 513. In the communication channel 513, a detection circuit 516 subjects the signal inversely spread with a spread code i (i=2 to m) in a correlation circuit 515 to coherent detection on the basis of the phase information 512, and a binary value decision circuit 517 outputs reception data 518.

On the other hand, the pilot channel can be used as information other than coherent detection. In FIG. 5, reception power for each sampling (phase) is calculated in a power detection circuit 506 from the output of the correlator of the pilot channel 503, and a chip synchronous signal 508 is output by integrating (filtering) the reception power with a predetermined time constant in a chip synchronous circuit 507. This chip synchronous signal 508 is used to determine the phase of inverse spread with a spread code (i) 514 in the correlation circuit 515 of the communication channel 513. In the case of a system wherein any other cell transmits pilot channels and the same spread code (1) 504 is used with shifting the phase, it is possible to obtain other-cell signal level information 510 from the output of the power detection circuit via an other-cell monitor circuit 509. At this time, the transmission power of the pilot channel required to obtain the chip synchronous signal 508 and the other-cell signal level information 510 can be lower than the power required for coherent detection, because the output of the power detection circuit is integrated in the chip synchronous circuit 507 and the other-cell monitor circuit 509.

Moreover, Unexamined Japanese Patent Publication (kokai) No. 7-76049 discloses that the base station controls the directivity of a transmission antenna on a communication channel to make transmission so as to deal with the suppression of interference. FIG. 6 shows the situation in which the directivity is controlled. A base station 601 transmits signals to three mobile stations 602, 603, 604 while controlling the directivity of communication channels in the three directions of A, B, C. On the other hand, a pilot channel to be transmitted as a reference signal for coherent detection needs transmitting without directivity, because the pilot channel is commonly used for the communication channels. At this time, the propagating path of the pilot channel is different from that of the communication channel. Namely, as shown in FIG. 6, paths 605, 606 refer to the situation in which the pilot channel transmitted without directivity has propagated through the path different from that of the communication channel, that is, the communication channel transmitted to have the directivity A never pass through the paths 605, 606. Therefore, the phase information of the pilot channel signal differs from that of communication channel signal.

In the conventional multiple transmission of a pilot channel, it is necessary to transmit the pilot channel with relatively strong power with respect to any other communication channel which may interfere with the pilot channel in order to increase the reliability of the pilot channel and improve coherent detection performance. More specifically, with reference to FIG. 4, the weight W (1) 405 tends to become large in value (W1>Max W2 . . . Wm) as compared with the communication channel. If, however, W (1) is increased, the reliability of the reference signal for coherent detection is increased on one hand but since interference with communication channels (of any other station) is also increased, there arises a problem resulting in lowering communication channel quality.

Moreover, when the base station controls the directivity of the transmission antenna on a communication channel basis, the phase information of the pilot channel is impossible to use for making the coherent detection of the communication channel since the phase information obtained from the pilot channel differs from the detection phase of the communication channel.

SUMMARY OF THE INVENTION

It is an object of the present invention to provide an excellent CDMA cellular radio transmission system capable of reducing the interference (interference among stations) which is given to a communication channel by a pilot channel in a base station, and making coherent detection on the side of a mobile station when the communication channel is transmitted by controlling the directivity of a transmission antenna.

A CDMA cellular radio transmission system using a direct spread CDMA method according to the present invention is comprised of a base station and a mobile station. In the base station, a pilot channel and output communication channels with a pilot symbol inserted therein are output, and the pilot channel and the communication channels are multiplexed at the same frequency so as to transmit the combination of the multiplexed pilot channel and the communication channels. In the mobile station, chip synchronization with a combination of a pilot channel and communication channels which are multiplexed and transmitted by the base station with pilot symbols inserted in the respective communication channels are obtained, and coherent detection is carried out by using the pilot channel inserted in the communication channel.

According to the present invention, the base station transmits, in addition to the pilot channel, the communication channel with the pilot symbol (known symbol) periodically inserted therein for the purpose of insert-type coherent detection, which makes unnecessary the transmission of the reference signal for coherent detection with high power so as to attain high reliability in comparison with the communication channel, whereby interference with the communication channel of any other station is reduced. Moreover, the phase of the inverse spread code in the communication channel is obtainable by detecting the chip synchronous signal from the multiplex signal transmitted from the base station. Even when transmission is made by controlling the directivity of the transmission antenna for each communication channel on the base station side, the phase of the inverse spread code in the communication channel is obtainable and by detecting the other-cell signal information, the coherent detection can be made accurately from the pilot symbol inserted in the communication channel.

PREFERRED EMBODIMENTS OF THE INVENTION

Preferred embodiments of the present invention will be described as follows referring to the accompanying drawings.

Embodiment 1

Figure 1:
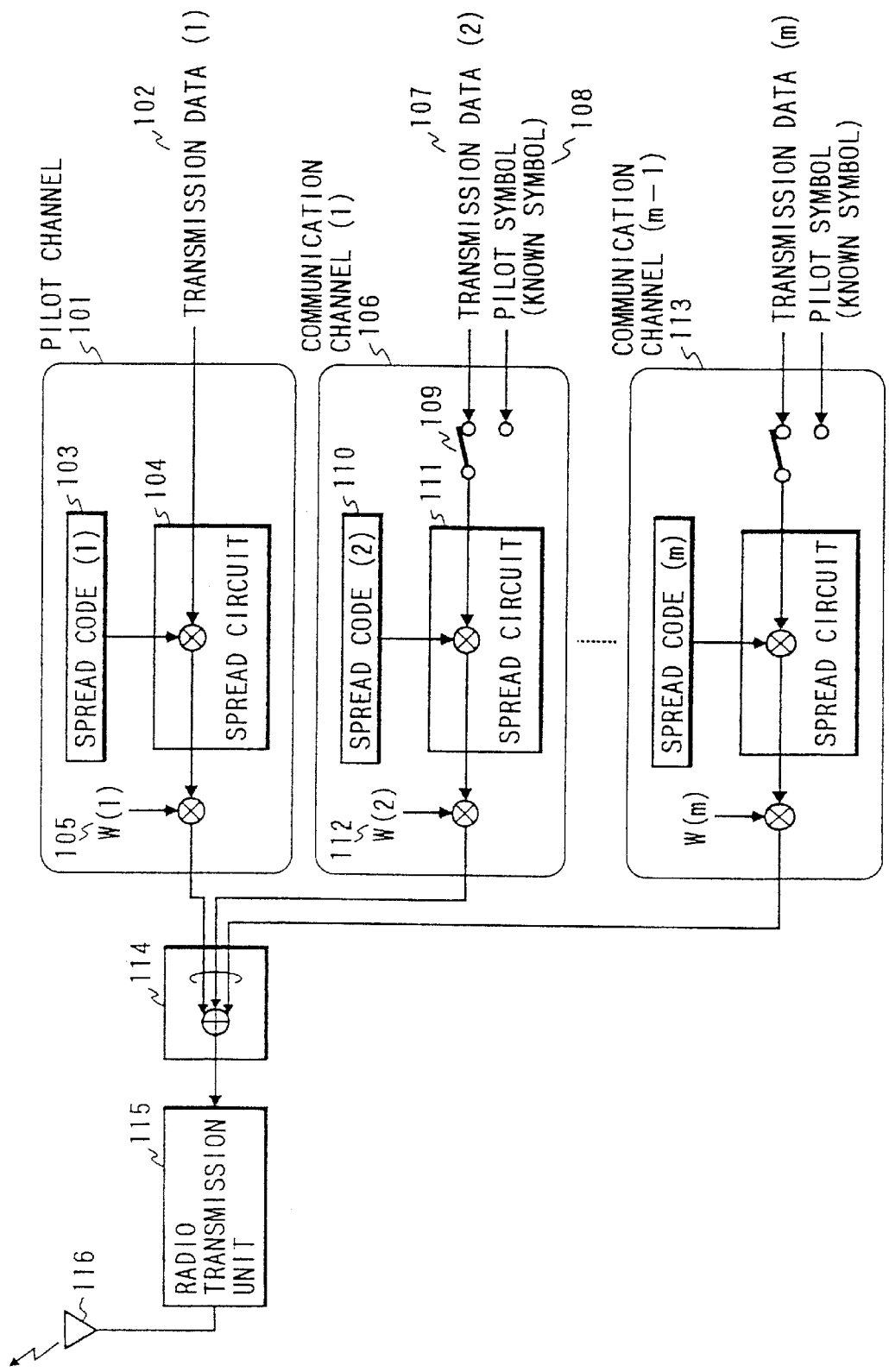
FIG. 1 is a block diagram illustrating the structure of a base station in a CDMA cellular radio transmission system according to Embodiments 1, 2, 4 and 5 of the invention.

FIG. 1 is a block diagram illustrating the structure of a base station in a cellular radio transmission system using a CDMA method according to Embodiment 1 of the present invention. In FIG. 1, reference numeral 101 denotes a pilot channel; 102, transmission data (1); 103, a spread code (1); 104, a spread circuit; 105, weight W (1); 106, a communication channel (1); 107, transmission data (2); 108, a pilot symbol (known symbol); 109, a switch; 110, a spread code (2); 111, a spread circuit; 112, weight W (2); 113, a communication channel (m−1); 114, a multi-circuit; 115, a radio transmission unit; and 116, an antenna.

The operation of the base station according to this embodiment will be described. In the pilot channel 101, the transmission data (1) 102 is spread with the spread code (1) 103 in the spread circuit 104 and multiplied by the weight W (1) 105, and further the multiplied transmission data (1) 102 is output therefrom. At this time, the transmission data (1) 102 is not necessarily a piece of information to be transmitted and may be unmodulated data (data of totally 0 or 1). In FIG. 1, it is assumed that the number of communication channels is m−1. The communication channel (1) 106 transmits the transmission data (2) 107 on one hand, and transmits to output the pilot symbol 108 which is switched via the switch 109 with each period T on the other. The pilot symbol is spread with the spread code (2) 110 in the spread circuit 111 and multiplied by the weight W (2) 112 before being output. The same operation is performed in any other communication channel up to the communication channel (m−1). The outputs of the respective channels are multiplexed in the multi-circuit 114 and up-converted in the radio transmission unit 115. Then, the up-converted output is transmitted from the antenna 116.

According to Embodiment 1 of the invention, the pilot symbol (known symbol) for the purpose of insert-type coherent detection is. periodically inserted in each communication channel. Accordingly, the interference with the communication channel of any other station can be reduced, because it is unnecessary to transmit a reference signal for coherent detection with high power in comparison with the communication channel in order to attain high reliability. Even when the communication channel is transmitted by exerting transmission antenna control, radio transmission excellent in static characteristics can be carried out since the pilot symbol inserted in the communication channel is usable for coherent detection on the mobile station side.

Embodiment 2

The structure of a base station in the cellular radio transmission system using the CDMA method according to Embodiment 2 of the present invention is similar to the base station according to Embodiment 1 thereof. In FIG. 1, weight W (2) to W (m) in the communication channel are used for transmission power control, that is, for giving weight to the transmission power among the communication channels. According to this embodiment, on the other hand, the value of the weight W (1) 105 of the pilot channel is set lower than the values of weight of any other communication channel, for example, transmission with W1<Min W2 . . . Wm is carried out with respect to minimum values Min W2 . . . Wm of W (2) to W (m).

Figure 2:
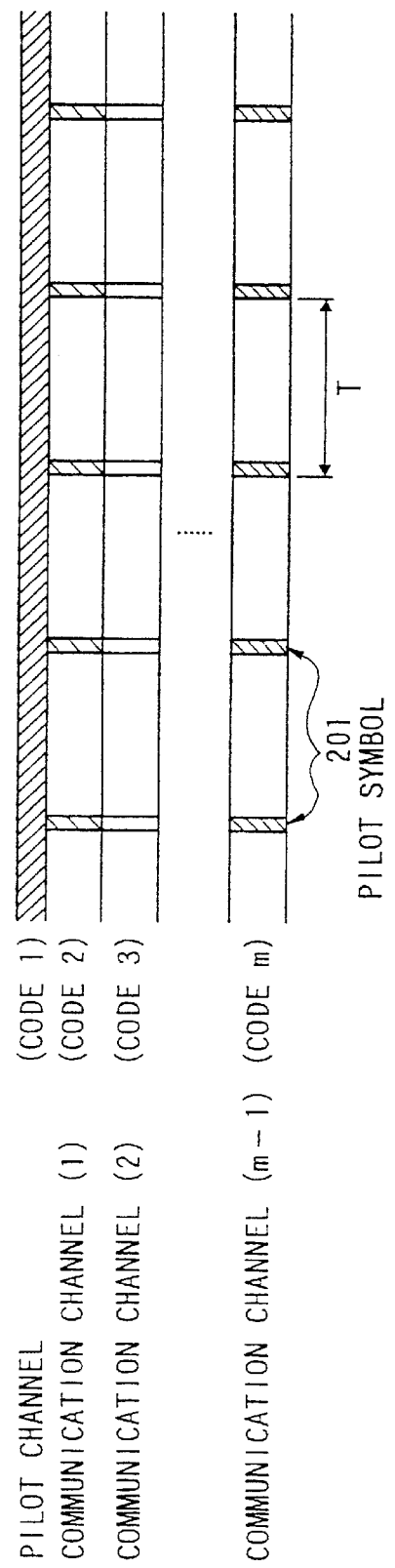
FIG. 2 is a channel format illustrating an example of pilot channel multiplex and insertion of pilot symbols according to Embodiments 2 and 5 of the invention.

FIG. 2 is a channel format according to this embodiment of the invention. A pilot symbol 201 in addition to transmission data is inserted in each communication channel. In FIG. 2, the height of each channel indicates the transmission power thereof. Although the weight W (2) to W (m) of the communication channels are set equal according to this embodiment, a pilot channel 203 is transmitted with low power in comparison with the communication channel.

FIG. 2 shows a state in which a signal formed by superposing the pilot channel on the communication channels is continuously transmitted. The aforementioned channels can be transmitted in a multiplex mode even in a burst transmission method in which ON/OFF transmission in terms of time is effected, an intermittent transmission method or a TDD (Time Division Duplex) method in which the same radio frequency is divided for reception/transmission in terms of time.

As set forth above, according to Embodiment 2, the high reliability of the pilot channel as the reference signal for coherent detection is unnecessary. Since the pilot channel can be transmitted with low power in comparison with the communication channel, the interference with any other station by the pilot channel is reducible, and consequently communication channel quality can be improved.

Embodiment 3

Figure 3:
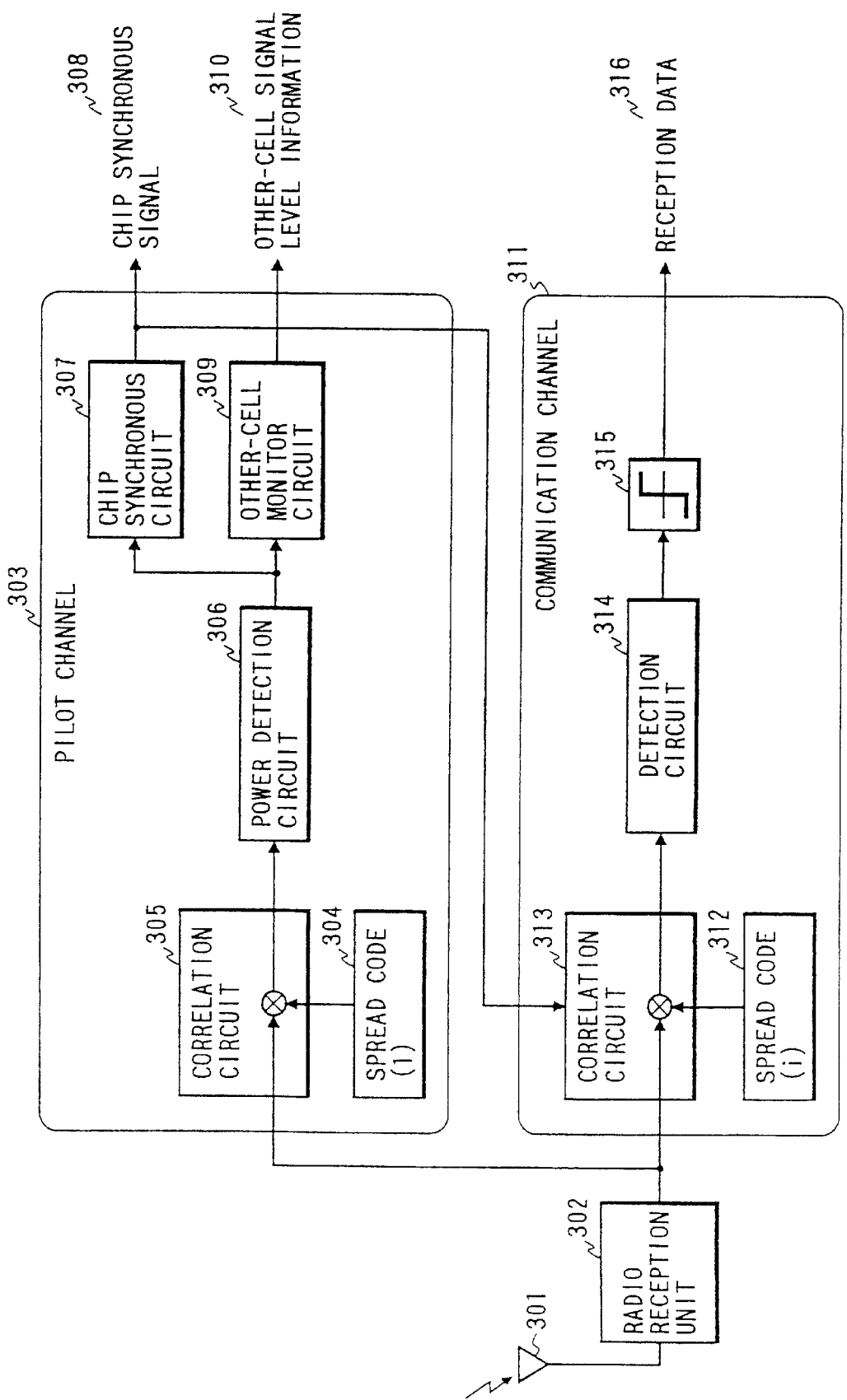
FIG. 3 is a block diagram illustrating the structure of a mobile station in the CDMA cellular radio transmission system according to Embodiments 3, 4 and 5 of the invention.
Figure 4:
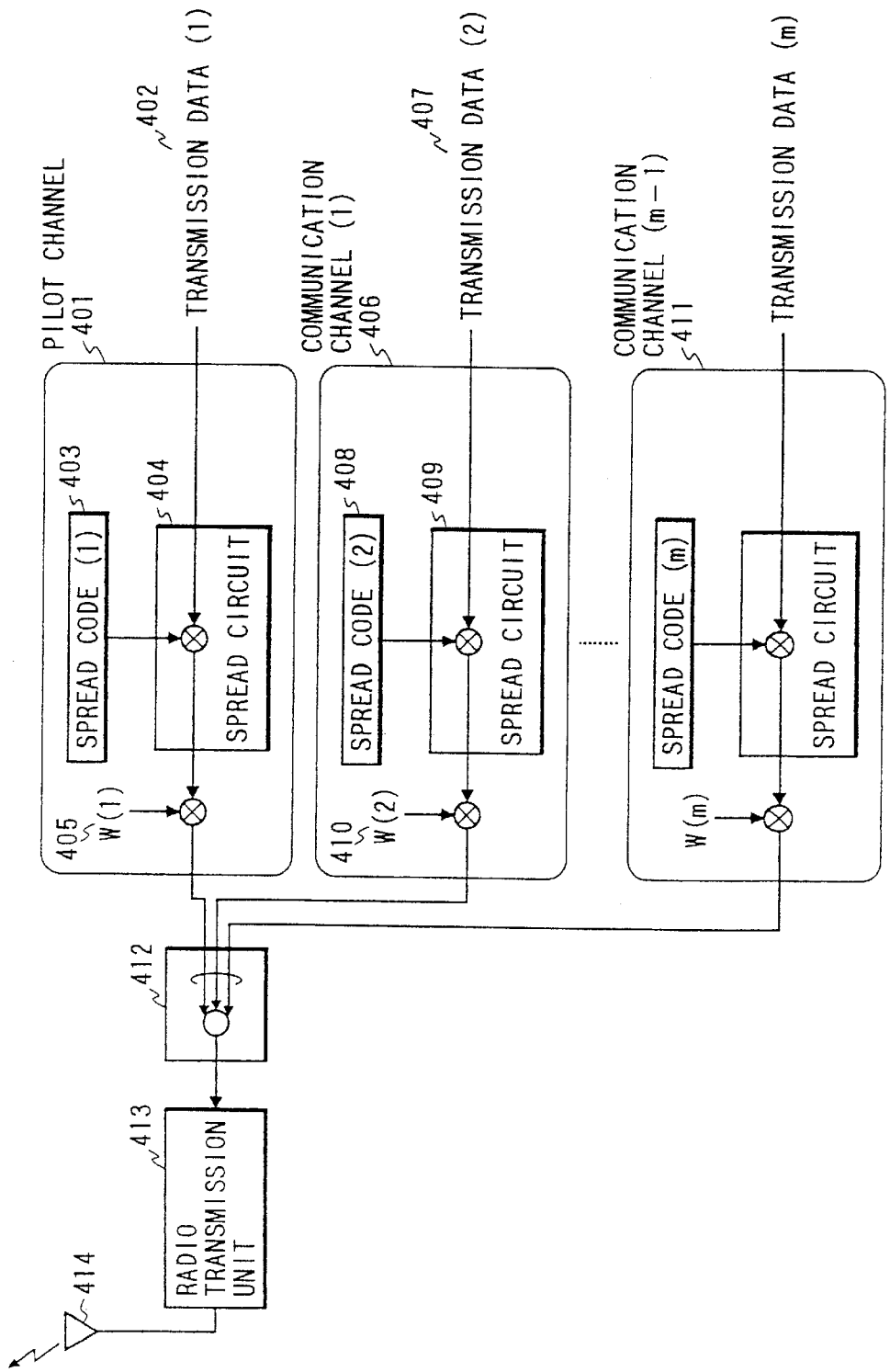
FIG. 4 is a block diagram illustrating the structure of a base station in a conventional CDMA cellular radio transmission system.
Figure 5:
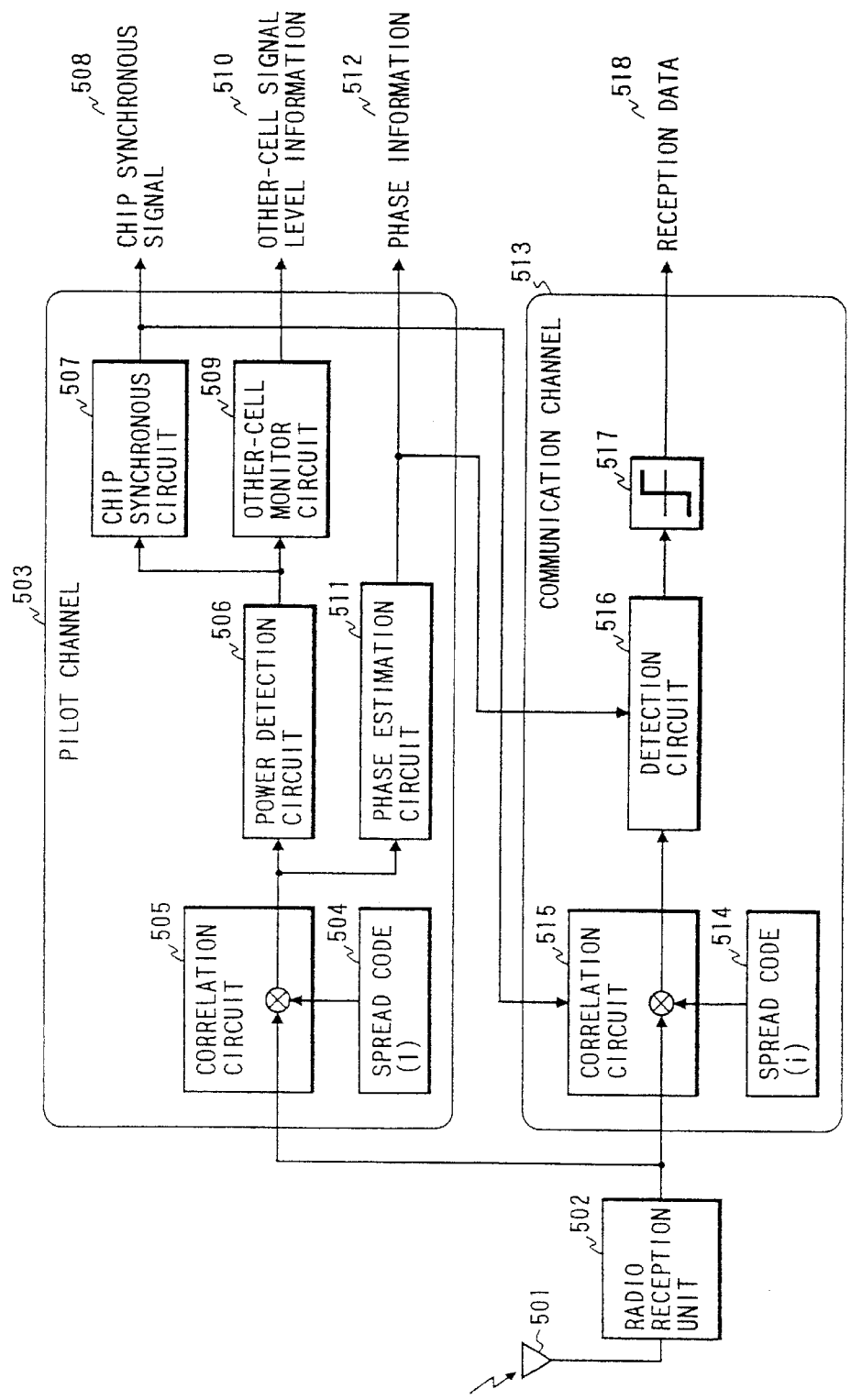
FIGS. 5 is a block diagram illustrating the structure of a mobile station in a conventional CDMA cellular radio transmission system.
Figure 6:
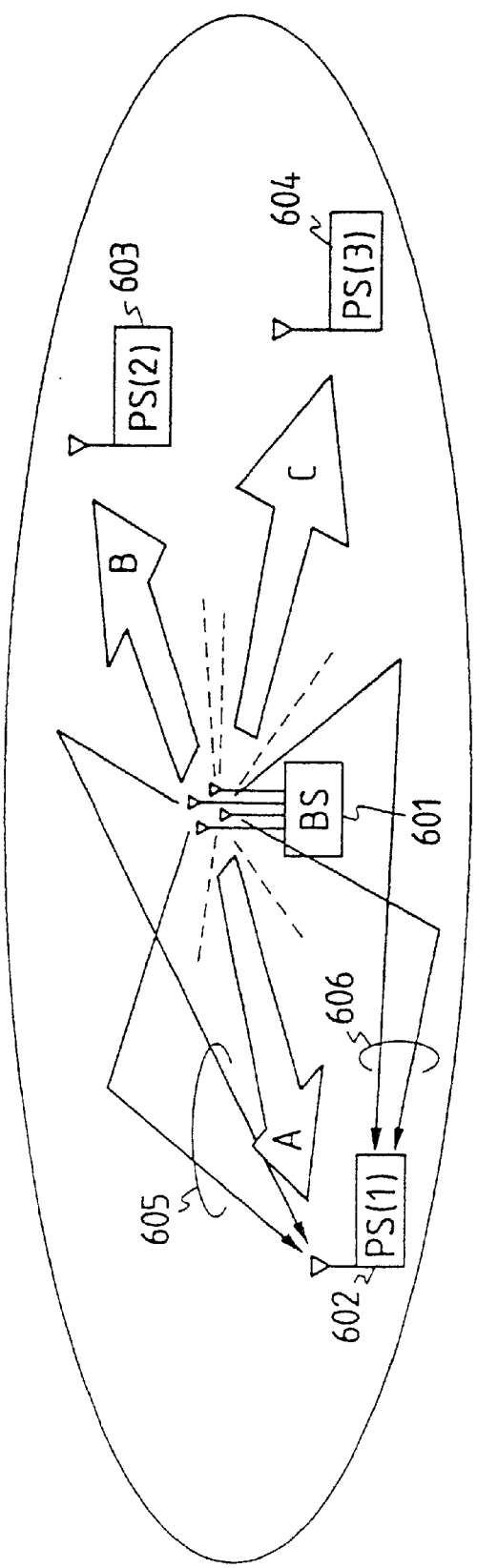
FIG. 6 is an exemplary diagram illustrating an example of propagation paths in transmission antenna directivity control and non-directivity transmission.
Figure 7:
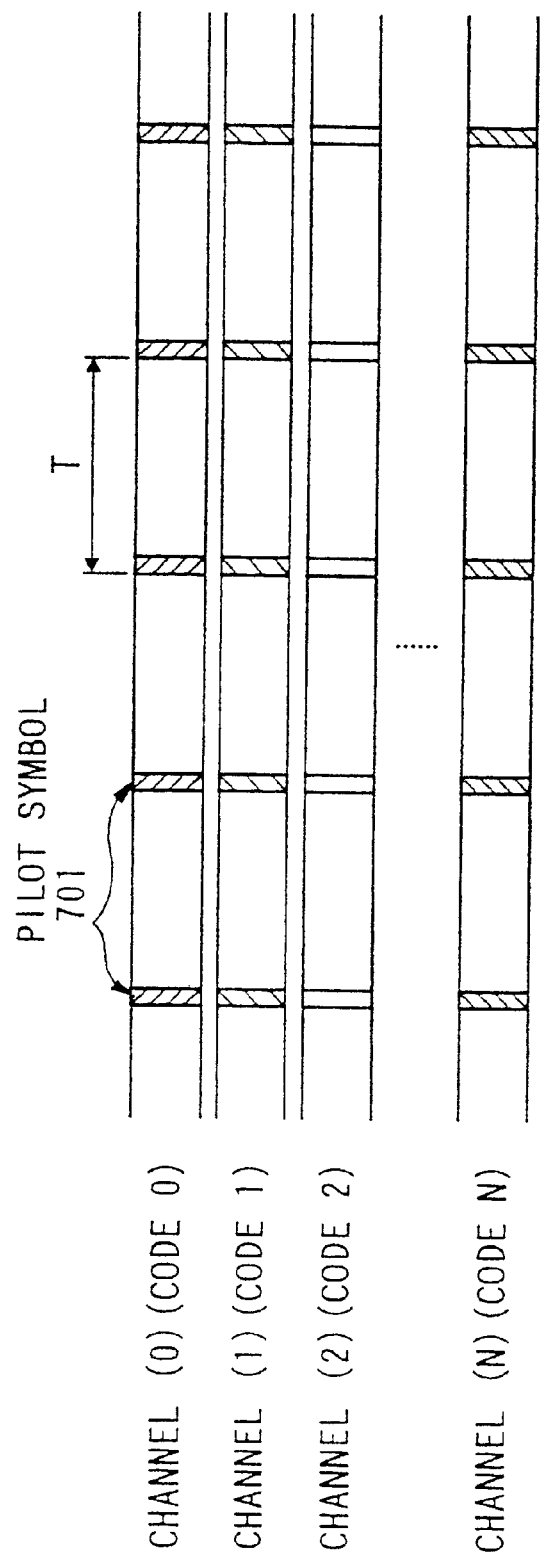
FIG. 7 is a channel format illustrating an example of insertion of pilot symbols in the conventional art.
Figure 8:
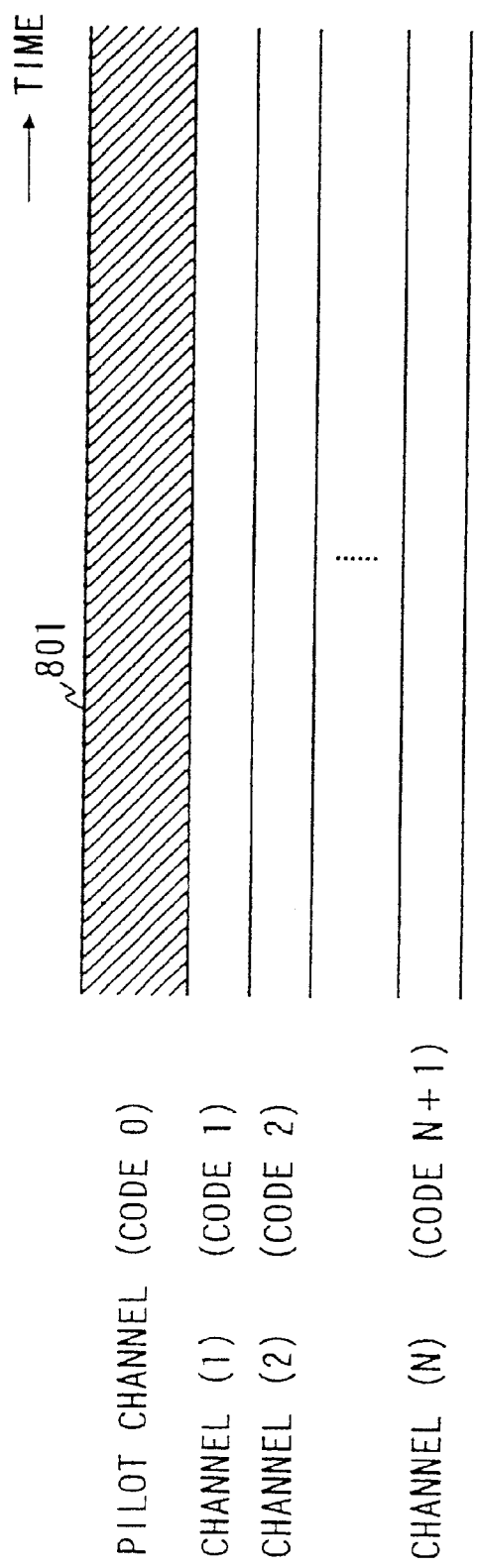
FIG. 8 is a channel format illustrating an example of pilot channel multiplex in the conventional art.

FIG. 3 a block diagram illustrating the structure of a mobile station in the cellular radio transmission system using the CDMA method according to Embodiment 3 of the invention. In FIG. 3, reference numeral 301 denotes an antenna; 302, a radio reception unit; 303, a pilot channel; 304, a spread code (1); 305, a correlation circuit; 306, a power detection circuit; 307, a chip synchronous circuit; 308, a chip synchronous signal; 309, an other-cell monitor circuit; 310, other-cell signal level information; 311, communication channel; 312, spread code (i); 313, a correlation circuit; 314, a detection circuit; 315, a binary value decision circuit; and 316 reception data.

The operation of the mobile station according to this embodiment will be described. The signal received by the antenna 301 is down-converted in the radio reception unit 302. In the pilot channel 303, the signal is inversely spread with the spread code (1) 304 in the correlation circuit 305, and reception power is calculated on a sampling (phase) basis in the power detection circuit 306. Then the signal is subjected to integration (filtering) with a predetermined time constant in the chip synchronous circuit 307. Thus, the chip synchronous signal 308 is output. The chip synchronous signal 308 is used to determine the phase of the inverse spread with respect to the spread code (i) in the correlation circuit 313 of the communication channel 311. In the case of a system wherein any other cell uses the same spread code (1) 304 and transmits a pilot channel by shifting the phase, the other-cell signal level information 310 is obtainable by retrieving the reception level of a pilot channel having a different phase from the output of the power detection circuit 306 via the other-cell monitor circuit 309.

In the communication channel 311, the signal inversely spread with the spread code (i) 312 in the correlation circuit 313 is subjected to coherent detection by using the inserted pilot symbol in the detection circuit 314 and demodulated according to the decision made by the binary value decision circuit 313. Thus the reception data 316 is output.

Regarding to the chip synchronous signal 308, it not always necessary to use the pilot channel. The correlator of the communication channel is formed with a digital matched filer and a plurality of sliding correlators so as to obtain the chip synchronous information by using the output of the correlator. Further, power detection is also not always necessary to obtain the chip synchronous signal 308. Moreover, an arrangement for obtaining the other-cell signal level information 310 is unnecessary when a system is not adopted in which any other cell uses the same spread code (1) 304 and transmits the pilot channel by shifting the phase.

As set forth above, according to Embodiment 3, the mobile station is provided with the chip synchronous circuit 307 for obtaining chip synchronization from the pilot channel, the other-cell monitor circuit 309 for obtaining the other-cell signal information and the detection circuit 314 for making coherent detection from the communication channel. Accordingly, the phase of the inverse spread code in the communication channel is obtained by detecting the chip synchronous signal and the other-cell signal information from the pilot channel transmitted with power lower than that of the communication channel from the base station. Moreover, even when the base station carries out transmissions by controlling the directivity of the transmission antenna on each communication channel, accurate coherent detection is possible from the pilot symbol inserted in the communication channel.

Embodiment 4

In a cellular radio transmission system using the CDMA method according to Embodiment 4 of the invention, the base station shown in FIG. 1 according to Embodiment 1 is combined with the mobile station shown in FIG. 3 according to Embodiment 3.

According to this embodiment, the base station transmits, in addition to the pilot channel, the communication channel with the pilot symbol (known symbol) periodically inserted therein for the purpose of insert-type coherent detection. Accordingly, it is not necessary to transmit the reference signal for coherent detection with high power so as to attain high reliability in comparison with the communication channel. Therefore, interference with the communication channel of any other station can be reduced and the coherent detection can be made on the mobile station side by using the pilot symbol inserted in the communication channel. Even when transmission is made by controlling the directivity of the transmission antenna for each communication channel on the base station side, the phase of the inverse spread code in the communication channel is obtainable, and by detecting the other-cell signal information, the coherent detection in one's own cell can be made accurately.

Embodiment 5

In a cellular radio transmission system using the CDMA method according to Embodiment 5, the base station shown in FIG. 2 according to Embodiment 2 is combined with the mobile station shown in FIG. 3 according to Embodiment 3.

According to this embodiment, in the base station side, the pilot channel is not necessary to obtain the high reliability as the reference signal for coherent detection. Accordingly, the base station set the weight for making transmission in lower power than that of the communication channel to thereby further reduce the interference among the base stations due to the pilot channel. On the mobile station side, accurate coherent detection can be effected by making the coherent detection from the communication channel with the pilot symbol inserted therein with respect to the pilot channel transmitted with power lower than that of the communication channel.

As set forth above, the base station in the cellular radio transmission system using the direct spread CDMA method according to the present invention is provided with the means for outputting the pilot channel, the means for outputting the communication channel with the pilot symbol inserted therein and the means for transmitting the combination of the pilot and communication channels superposed at the same frequency. Consequently, the pilot channel need not attain high reliability as the reference signal for coherent detection and the interference with any other station by the pilot channel is made reducible by transmitting the pilot channel with low power in comparison with the communication channel. When the base station transmits the communication channel by controlling the antenna directivity on a communication channel basis, coherent detection is made from the pilot symbol inserted in the communication channel with the effect of allowing accurate coherent detection to be made.

What is claimed is:

1. A CDMA base station apparatus comprising:

means for outputting a pilot channel;

means for outputting communication channels with a pilot symbol inserted therein; and transmitting means for multiplexing the pilot channel and the communication channels at the same frequency and transmitting the combination of the multiplexed pilot channel and the communication channels, wherein the communication channels are transmitted with directivity.

2. A CDMA mobile station apparatus receiving a signal transmitted from a CDMA base station apparatus, said CDMA base station apparatus comprising means for outputting a pilot channel, means for outputting communication channels with a pilot symbol inserted therein, and transmitting means for multiplexing the pilot channel and the communication channels at the same frequency and transmitting the combination of the multiplexed pilot channel and the communication channels.

3. A CDMA mobile station apparatus comprising:

means for obtaining chip synchronization by using the signal of a pilot channel transmitted from a CDMA base station apparatus; and means for making synchronous detection by using pilot symbols inserted in a communication channel.

4. A CDMA mobile station apparatus comprising:

means for performing cell monitor by using a signal of a pilot channel transmitted from a CDMA base station apparatus; and means for making synchronous detection by using pilot symbols inserted in a communication channel.

5. A transmission method using a direct spread CDMA method, comprising the steps of:

outputting a pilot channel from a CDMA base station;

outputting communication channels with a pilot symbol inserted therein; and multiplexing and transmitting the pilot channel and the communication channels at the same frequency.

6. A transmission method using a direct spread CDMA method, comprising the steps of:

outputting a pilot channel from a CDMA base station; and outputting communication channels with a pilot symbol inserted therein;

wherein the pilot channel is transmitted, with low power in comparison with the communication channels.

7. A transmission method using a direct spread CDMA method, comprising the steps of:

outputting a pilot channel from a CDMA base station;

outputting communication channels with a pilot symbol inserted therein; and multiplexing and transmitting the pilot channel and the communication channels at the same frequency;

wherein the communication channels are transmitted with directivity.

8. A reception method using a direct spread CDMA method, comprising the steps of:

obtaining chip synchronization by using a signal of a pilot channel transmitted from a CDMA base apparatus; and making synchronous detection by using pilot symbols inserted in a communication channel.

9. A reception method using a direct spread CDMA method, comprising the steps of:

performing cell monitor by using a signal of a pilot channel transmitted from a CDMA base station apparatus; and making synchronous detection by using pilot symbols inserted in a communication channel.

10. A CDMA mobile station apparatus receiving a signal transmitted from a CDMA base station apparatus, said CDMA base station apparatus comprising means for outputting a pilot channel, means for outputting communication channels with a pilot symbol inserted therein, and transmitting means for multiplexing the pilot channel and the communication channels at the same frequency and transmitting the combination of the multiplexed pilot channel and the communication channels, wherein the pilot channel is transmitted with low power in comparison with the communication channel.

11. A CDMA mobile station apparatus receiving a signal transmitted from a CDMA base station apparatus, said CDMA base station apparatus comprising means for outputting a pilot channel, means for outputting communication channels with a pilot symbol inserted therein, and transmitting means for multiplexing the pilot channel and the communication channels at the same frequency and transmitting the combination of the multiplexed pilot channel and the communication channels, wherein the pilot channel is transmitted with low power in comparison with the communication channel and the communication channels are transmitted with directivity.

12. A mobile station apparatus receiving a signal transmitted from a base station apparatus, said base station apparatus comprising:

a circuitry that outputs a pilot channel, a circuitry that outputs communication channels with a pilot symbol inserted therein, a multiplexer which multiplexes the pilot channel and the communication channels at the same frequency, and a transmitter that transmits the combination of the multiplexed pilot channel and communication channels.

13. An apparatus as in claim 12, wherein said mobile station: apparatus comprises a CDMA mobile station apparatus and said base station apparatus comprises a CDMA base station apparatus.

14. A base station apparatus comprising:

a circuitry that outputs a pilot channel;

a circuitry that outputs communication channels with a pilot symbol inserted therein;

a multiplexer that multiplexes the pilot channel and the communication channels at the same frequency; and a transmitter that transmits the combination of the multiplexed pilot channel and communication channels, wherein the communication channels are transmitted with directivity.

15. An apparatus as in claim 14, wherein said base station apparatus comprises a CDMA base station apparatus.

16. A mobile station apparatus receiving a signal transmitted from a base station apparatus, said base station apparatus comprising a circuitry that outputs a pilot channel, a circuitry that outputs communication channels with a pilot symbol inserted therein, a multiplexer that multiplexes the pilot channel and the communication channels at the same frequency, and a transmitter that transmits the combination of the multiplexed pilot channel and communication channels, wherein the pilot channel is transmitted with low power in comparison with the communication channel and the communication channels are transmitted with directivity.

17. An apparatus as in claim 16, wherein said mobile station apparatus comprises a CDMA mobile station apparatus and said base station apparatus comprises a CDMA base station apparatus.

18. A mobile station apparatus comprising:

a circuitry that obtains chip synchronization by using the signal of a pilot channel transmitted from a base station apparatus; and a circuitry that makes synchronous detection by using pilot symbols inserted in a communication channel.

19. An apparatus as in claim 18, wherein said mobile station apparatus comprises a CDMA mobile station apparatus.

20. A mobile station apparatus comprising:

a circuitry that performs cell monitor by using the signal of a pilot channel transmitted from a base station apparatus; and a circuitry that makes synchronous detection by using pilot symbols inserted in a communication channel.

21. An apparatus as in claim 20, wherein said mobile station apparatus comprises a CDMA mobile station apparatus and said base station apparatus comprises a CDMA base station apparatus.

22. A mobile station apparatus receiving a signal transmitted from a base station apparatus, said base station apparatus comprising a circuitry that outputs a pilot channel, a circuitry that outputs communication channels with a pilot symbol inserted therein, a multiplexer that multiplexes the pilot channel and the communication channels at the same frequency, and a transmitter that transmits the combination of the multiplexed pilot channel and the communication channels, wherein the pilot channel is transmitted with low power in comparison with the communication channel.

23. An apparatus as in claim 22, wherein said mobile station apparatus comprises a CDMA mobile station apparatus and said base station apparatus comprises a CDMA base station apparatus.

* * * * *